Feb. 2, 1954     T. W. BARNES     2,667,651
THREAD CHASER AND CHASER ASSEMBLY
Filed Aug. 22, 1951
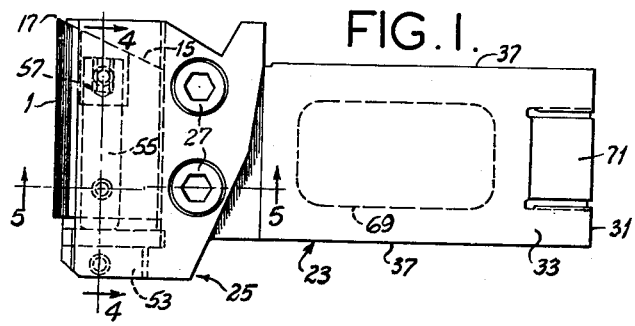
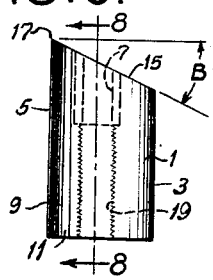
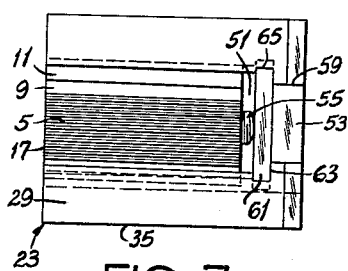
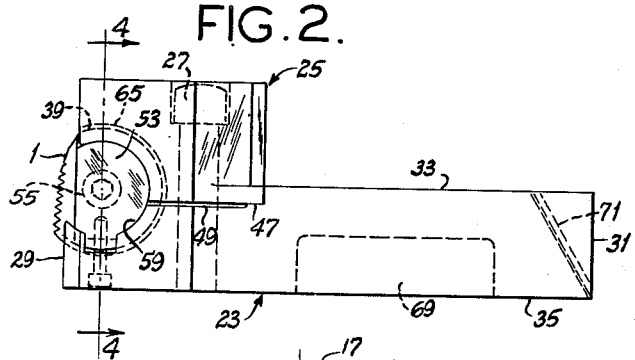
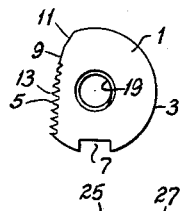
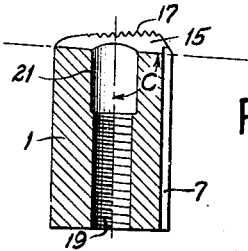
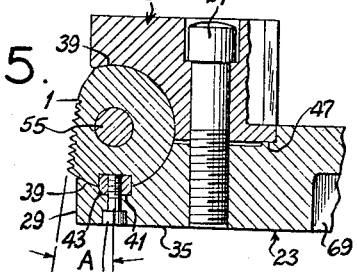
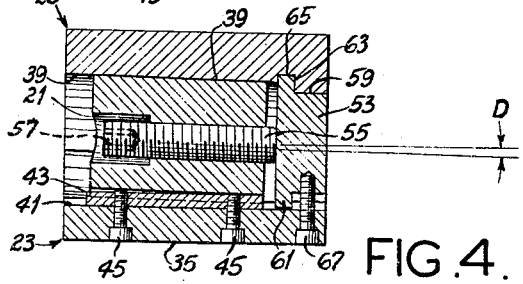
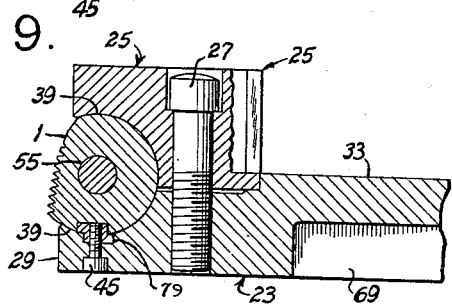
Tracy W. Barnes,
Inventor.
Koenig and Pope,
Attorneys.

Patented Feb. 2, 1954

2,667,651

UNITED STATES PATENT OFFICE 2,667,651

THREAD CHASER AND CHASER ASSEMBLY

Tracy W. Barnes, Webster Groves, Mo., assignor to John Ramming Machine Company, St. Louis, Mo., a corporation of Missouri Application August 22, 1951, Serial No. 243,142

11 Claims. (Cl. 10—111)

1

This invention relates to thread chasers and chaser assemblies, and more particularly to tangential chasers and chaser assemblies for use in the die heads of thread cutting apparatus wherein the chasers are made to recede as threading progresses to cut a taper thread.

Among the several objects of the invention may be noted the provision of an improved chaser and chaser assembly which may be economically manufactured with accurately fitting cooperative clamping surfaces of extensive area; the provision of a chaser and chaser assembly allowing for ready insertion, adjustment and removal of the chaser; the provision of a chaser and chaser assembly adapted accurately to hold the adjustment of the chaser under cutting thrust; and the provision of a chaser and chaser assembly allowing for adjustment of the chaser, within limits, to cut threads at different tapers.

In general, a chaser of this invention is characterized in having the form of a segment of a cylinder greater than a semicylinder bounded by a plane parallel to the axis of the cylinder, with an axial keyway in the cylindrical part of its surface. The face of the chaser in said bounding plane constitutes a thread cutting face which has serrations extending parallel to the axis of the cylinder substantially throughout the length of the face and being inclined at an angle with respect to the diametrical plane of the keyway, this angle being adapted for cutting tapered threads. The chaser is bevelled at one end to form a cutting edge. The chaser assembly comprises a chaser holder and a clamp associated with the holder having a cylindrical recess formed partly in the holder and partly in the clamp for receiving the chaser. A keyway extends axially of the recess and a key is positioned in the holder and chaser keyways. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, in which several of various possible embodiments of the invention are illustrated, Fig. 1 is a plan of a chaser assembly including a chaser;

2

Fig. 2 is a side elevation of Fig. 1;
Fig. 3 is a left end elevation of Fig. 2;
Fig. 4 is a section on lines 4—4 of Figs. 1 and 2;
Fig. 5 is a section on line 5—5 of Fig. 1;
Fig. 6 is a side elevation of the chaser per se;
Fig. 7 is a bottom end view of Fig. 6;
Fig. 8 is an axial section on line 8—8 of Fig. 6; and,
Fig. 9 is a view similar to Fig. 5 illustrating a modification.

Similar reference characters indicate corresponding parts throughout the several views of the drawings.

Referring to the drawings, a chaser made in accordance with this invention is designated 1. As shown, the chaser is of cylindrical form, having a cylindrical clamping surface 3 and a serrated thread cutting side face 5. More particularly, the chaser 1 consists of a cylindrical tool steel body generally having the form of a segment of a cylinder greater than a semicylinder cut by a plane parallel to the axis of the cylinder. The face of the body in this cutting plane constitutes the thread cutting face 5 and has serrations extending parallel to the cylinder axis throughout the length of the body. In the cylindrical surface 3 is an axial keyway 7 of uniform depth and extending throughout the length of the chaser. The plane of the cutting face 5 is slightly angled with respect to the diametrical plane of the keyway (see angle A in Fig. 5). This provides a taper angle related to a predetermined thread taper. For example, the angle A may be 1° 35' 40" for cutting a thread with a standard taper of 3/4" per foot. It will be understood that chasers with different taper angles may be provided for cutting threads with different tapers.

The chaser may be readily manufactured by milling the keyway 7 in a length of round tool steel stock, then milling a flat on the stock at the desired taper angle A with respect to the diametrical plane of the keyway, and then cutting axial V-shaped grooves in the flat throughout its length. The resultant flat serrated face is then bevelled as indicated at 9 to provide a throat, with an additional and more inclined bevel at 11. In the area of the throat 9, the V-shaped serrations or teeth resulting from the cutting of the grooves are incomplete, increasing in height from the bevel 11 to a first complete tooth 13 at what is the leading edge of the face 5 as regards the direction of movement of the chaser longitudinally of the work in cutting a thread. The remaining teeth on the face 5 rearward of tooth 13 are also complete.

One end 15 of the chaser is bevelled on angle B to provide a cutting edge 17 (Figs. 1 and 6). As best seen in Fig. 8, the face 15 is also at an angle C with respect to the axis of the chaser to provide not only the desired cutting relief angle, but also to provide a clearance or lead angle C so related to the helix angle D at which the chaser is positioned in the chaser assembly (as will be described in connection with Fig. 4) as to allow for clearance between the work being threaded and all teeth on face 5 except the first complete tooth 13. For example, the bevel B may be at an angle of 22° with respect to a plane perpendicular to the axis of the chaser, and at a lead angle C of 88° with respect to a diametrical plane perpendicular to the diametral plane of the keyway. The bevels B and C are hereinafter referred to as being a compound bevel. A tapped hole 19 extends axially through the chaser from one end to the other, with a counterbore 21 at the bevelled end of the chaser.

The holding device for the above-described chaser comprises a holder 23 and a clamp 25 for clamping the chaser to the holder. The clamp is a part separate from the holder, being held to the holder by clamp screws 27. The holder is adapted to be mounted in a die head, such as is shown in my copending application entitled Thread Cutting Apparatus, Serial No. 244,659, filed August 31, 1951. The die head includes wedge parts for inward and outward movement of the holder in the head, these being operative upon sloping surface 71. Gradual movement outward occurs as threading progresses in order to cut a taper thread. The holder has an inner end 29, an outer end 31 (at which is located surface 71), a flat face 33, a flat back face 35, and flat parallel sides 37.

The clamp 25 is mounted on the front face 33 at the inner end of the holder 23. The chaser is located in a cylindrical recess 39 which is formed partly in the holder and partly in the clamp. The cylindrical form of the recess is the same as that of the cylindrical clamping surface 3 of the chaser thus providing broad holder and clamp areas in clamping engagement with the chaser for a high degree of rigidity. The axis of the recess 39 lies in a plane transverse to the holder and is slightly tilted with a respect to the back face 35 of the holder so that the chaser, as mounted in the holding device, is oriented at the proper helix angle as related to the pitch of the thread to be cut. This helix angle D is shown somewhat exaggerated in Fig. 4. For example, in the case of an 8 pitch thread, it may be 0° 31'.

The holder 23 is formed with a keyway 41 extending axially the length of the recess 39. A key 43 is held in this keyway by screws 45. This key is received in the keyway 7 in the chaser. The position of the keyway 41 and key 43 is such that the face 5 is oriented at the proper taper angle with respect to the length of the work for cutting a particular taper thread, being in a transverse plane perpendicular to the holder. Thus when a straight key 43 is used as illustrated in Figs. 2–5, the plane of the face 5 generally corresponds to the previously mentioned taper angle. In view of the chaser being inclined at the helix angle, and in view of the lead angle of the cutting edge, the cutting face is so oriented that only the first complete tooth 13 is effective for thread cutting, clearance being obtained between the remaining complete teeth and the work so that they serve mainly to clear out of the thread groove cuttings from the first complete tooth.

Rather than forming the portions of recess 39 in the holder and the clamp separately, it is more convenient and accurate to machine the recess in the assembled holder and clamp. This is best accomplished by inserting a shim between the holder and clamp, tightening the clamp screws 27, and then boring the recess in the assembly. It will be understood that the recess is bored at the aforesaid helix angle D. After boring, the recess may be finished by grinding within close limits to the same diameter as the chaser. The clamp screws are then loosened and the shim then removed.

The clamp 25 engages the holder 23 only on a narrow ledge 47 spaced from the end 29 of the holder, with a clearance space 49 between the clamp and holder from this ledge to the chaser. It is in this space that the above-mentioned shim is inserted, the thickness of the shim corresponding to the height of the ledge. The clamp screws 27 are located between the ledge and the chaser. The clearance space 49 allows for pivoting action of the clamp on the ledge for rigid clamping of the chaser.

The recess 39 has the form of a segment of a cylinder greater than a semi-cylinder cut by a plane parallel to the axis of the cylinder corresponding to the form of the chaser. It is open sidewise at the said plane at the end of the holder-clamp assembly, so that there is a gap 51 lengthwise of the recess at which the thread cutting face 5 of the chaser is exposed. The recess is closed at one end by an abutment or plug 53, being open at its other end. The chaser is positioned in the recess with its bevelled end 15 at the open end of the recess. It is adjusted as to its axial position in the recess by an adjusting screw 55 threaded in the tapped hole 19, with the end of the screw engaging the plug.

Adjustment of the chaser is made (clamp screws 27 loosened) by turning the screw 55 while maintaining its end in engagement with the plug. Since the chaser is held against turning by the key 43, this results in axial movement of the chaser. The adjusting screw 55 has a hexagonal socket 57 in its end in the counterbore 21 of hole 19. A tool may be readily inserted in the socket for turning the screw. When the chaser has been adjusted axially to the proper position for proper tangency of the cutting edge 17 and the work, the clamp screws 27 are tightened rigidly to clamp the chaser in position.

The abutment or plug 53 fits in a reduced end 59 of the recess 39, and has a flange 61 engaging a shoulder 63 at the inner end of the reduced end 59. The flange is received in a groove 65 formed in the holder and clamp adjacent the shoulder. The plug is held to the holder by a screw 67.

The holder is also shown as having a recess 69 in its back face 35 and the bevel 71 at its outer end 31. These features are utilized in conjunction with the die head mechanism disclosed in my aforesaid copending application, but are not essential to the invention claimed herein. It will be understood that the chaser and holding device may be used in die heads other than that disclosed in said copending application, and hence that the holder may be made otherwise than herein disclosed so far as concerns its cooperation with die head mechanism.

Fig. 9 shows how an offset key 73 may be used instead of the straight key 43 to orient the thread cutting face 5 of the chaser at a different taper angle from that obtained with a straight key. This within limits enables the same chaser to be used for cutting threads with different tapers and is practical as long as the offset is small. In Fig. 9 the offset is exaggerated so that it may be readily apparent.

In the above-described chaser and holding device, the serrations on the thread cutting face of the chaser are parallel to the chaser axis, and the helix angle is established by the inclination of the chaser axis with respect to the holder (see angle D). It is contemplated, however, that the serrations on the thread cutting face might be made inclined to the chaser axis by the amount of the desired helix angle, and the chaser mounted in the holder with its axis parallel rather than inclined to the back face of the holder. That is, the axis of the recess 39 would be made parallel rather than inclined at the helix angle to the back face of the holder, making angle D zero. However, even in this event, the serrations will still extend generally along the chaser axis but at a slight angle equal to D.

The above-described chaser and holding device may be economically manufactured with accurately fitting cooperative clamping surfaces of extensive area on the chaser (clamping surface 3) and the holding devices (the cylindrical recess surface 39). This is because a length of round tool steel stock may be readily machined by simple machining operations to form the chaser, and recess 39 may be readily bored in the pre-assembled clamp and holder and with close tolerance finished to the diameter of the chaser. A chaser may be readily placed in or removed from the holding device simply by loosening the clamp screws, and may be readily axially adjusted simply by turning the adjusting screw 55. Adjustment of the chaser is accurately maintained under cutting thrust and there is no appreciable tendency for the screw 55 to cant. By using offset keys, the same chaser can be used to cut threads of different tapers.

While I have described the invention particularly as applied to tangential chasers and chaser assemblies for use in receding die heads, it will be understood that the basic principles of the invention may be utilized with respect to form-cutting chasers and chaser assemblies such as are used in a standard non-receding die head, wherein the chasers remain fixed in position in the die head in making a cutting pass.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A chaser comprising a body generally having the form of a segment of a cylinder greater than a semicylinder bounded by a plane parallel to the axis of the cylinder and having an axial keyway in its cylindrical portion, the face of the body in the bounding plane constituting a thread cutting face and having serrations extending substantially parallel to the axis of the cylinder throughout a substantial portion of the length of the face, the body being beveled at one end to form a cutting edge and having a tapped opening extending therethrough from one end to the other for receiving an adjusting screw.

2. A chaser as set forth in claim 1, wherein the bevel at said one end of the body is at a compound angle.

3. A chaser as set forth in claim 1, wherein the thread cutting face is formed with a throat-forming portion.

4. A chaser comprising a body generally having the form of a segment of a cylinder greater than a semicylinder bounded by a plane parallel to the axis of the cylinder, the body having an axial keyway in the cylindrical part of its surface, the face of the body in said bounding plane constituting a thread cutting face and having serrations extending parallel to the axis of the cylinder substantially throughout the length of the face and being inclined at an angle with respect to the diametrical plane of the keyway, said angle being adapted for cutting tapered threads, the body being bevelled at one end to form a cutting edge.

5. A chaser as set forth in claim 4 further having a tapped hole extending therethrough from one end to the other on the cylinder axis for receiving an adjusting screw.

6. A chaser as set forth in claim 4 wherein the thread cutting face is bevelled to provide a throat portion, with incomplete serrations in the throat portion and complete serrations rearward of the throat.

7. A chaser as set forth in claim 6 wherein the bevel at said one end of the body is at a compound angle.

8. A chaser assembly comprising a holder and a clamp associated with the holder having a chaser-receiving recess formed partly in the holder and partly in the clamp, the recess having the form of a segment of a cylinder greater than a semicylinder, a keyway extending axially of the recess, a chaser generally having the form of a segment of a cylinder greater than a semicylinder bounded by a plane parallel to the axis of the cylinder and corresponding to the form of the recess and clamped by the cylindrical surface in the recess, the face of the chaser in said bounding plane constituting a thread cutting face having serrations extending parallel to the cylindrical axis of the chaser throughout a substantial portion of the length of the face, the chaser being bevelled at one end to form a cutting edge, said chaser having an axial keyway in its cylindrical surface, and a key positioned in said keyways.

9. A chaser assembly comprising a holder and a clamp associated with the holder having a chaser-receiving recess formed partly in the holder and partly in the clamp, the recess having the form of a segment of a cylinder greater than a semicylinder bounded by a plane parallel to the axis of the cylinder and being open sidewise at said plane, said recess having a keyway, an abutment at one end of the recess, the other end of the recess being open, a key extending axially of the recess and located in said keyway, a chaser generally having the form of a segment of a cylinder greater than a semicylinder corresponding to the form of the recess and clamped by its cylindrical surface in the recess, said chaser having a thread cutting face exposed at the sidewise opening of the recess, said thread cutting face having serrations extending parallel to the cylindrical axis of the chaser substantially throughout the length of the face, the chaser being bevelled at its end adjacent the open end of the recess to form a cutting edge, said chaser having an axial keyway receiving said key, the chaser having a tapped axial hole extending from one end to the other, and an adjusting screw threaded in the hole and having its end engaging the abutment for axially locating the chaser in the recess.

10. A chaser assembly as set forth in claim 9 wherein the recess is inclined at a helix angle with respect to the holder.

11. A chaser assembly as set forth in claim 9 wherein the key has a portion located in said keyway in the recess and an offset portion located in the keyway in the chaser.

TRACY W. BARNES.

References Cited in the file of this patent

UNITED STATES PATENTS

| Number | Name | Date |
|---|---|---|
| 361,572 | Baville | Apr. 19, 1887 |
| 1,492,425 | Cashman | Apr. 29, 1924 |
| 1,497,409 | Shaw | June 10, 1924 |
| 1,721,129 | Mehl | July 16, 1929 |
| 2,344,925 | Smith | Mar. 21, 1944 |